United States Patent [19]
Knowles et al.

[11] Patent Number: 5,782,200
[45] Date of Patent: Jul. 21, 1998

[54] POULTRY FEEDER

[76] Inventors: James A. Knowles, 608 S. Cumberland St., Wallace, N.C. 28466; Joseph E. Knowles, 1224 Cornwallis Rd., Rose Hill, N.C. 28458; Larry M. Knowles, 1224 Cornwalli8s Rd., Rose Hill, N.C. 28458; Marvin E. Knowles, 1224 Cornwallis Rd., Rose Hill, N.C. 28458

[21] Appl. No.: 745,160

[22] Filed: Nov. 7, 1996

[51] Int. Cl.$^6$ .................................................. A01K 39/60
[52] U.S. Cl. .................................................. 119/53
[58] Field of Search ........................ 119/52.1, 52.2, 119/52.3, 53, 53.5, 54, 57.8, 57.9

[56] References Cited

U.S. PATENT DOCUMENTS

| | | | |
|---|---|---|---|
| 2,512,260 | 6/1950 | Powell | 119/53.5 |
| 2,583,203 | 1/1952 | Bergeron | 119/52.1 |
| 2,941,506 | 6/1960 | Fulton | 119/53 |
| 5,291,855 | 3/1994 | Laverty | 119/52.3 |
| 5,699,753 | 12/1997 | Aldridge, III | 119/52.1 |

*Primary Examiner*—Thomas Price
*Attorney, Agent, or Firm*—Mills & Associates

[57] ABSTRACT

An improved gravity feeder for poultry and domestic animals which will dispense variable quantities of feed depending upon the dietary requirements of the particular fowl or animal is disclosed. The gravity feeder includes a generally cylindrical feed storage hopper having top and bottom openings mounted on an underlying circular feed tray having an upwardly projecting conical surface and an upwardly extending peripheral side wall wherein feed is dispensed for consumption. The feed tray includes a plurality of hopper support pads disposed at regular angular intervals about the conical surface of the tray coincident with a diameter of the hopper so as to provide adequate support for the same when disposed in functional relation to the feed tray. The hopper support pads are provided with at least one horizontally disposed slot being adapted to interlock with a corresponding pattern of mating notches formed about the lower interior edge of the hopper securing the hopper to the tray and simultaneously setting a vertical dimension for feed discharge openings formed therebetween. In an alternative embodiment the hopper support pads include a plurality of horizontally disposed slots configured vertically to interlock with the mating notches formed on the hopper to provide incremental vertical adjustment of the feed discharge openings to increase the amount of feed dispensed in order to meet the dietary requirements of a particular species at the various stages of life cycle and production.

7 Claims, 3 Drawing Sheets

POULTRY FEEDER

This application claims the benefit of U.S. provisional application No. 60/006,386 filed on Nov. 8, 1995 by James A. Knowles, Joseph E. Knowles, Larry M. Knowles, and Marvin E. Knowles for Improved Poultry Feeder.

BACKGROUND OF INVENTION

Field of Invention

This invention relates to poultry and domestic animal feeders and, more particularly, to an improved gravity poultry feeder which will dispense variable quantities of feed depending upon the dietary requirements of the particular fowl or animal.

In commercial turkey production, baby turkeys called poults are kept in cardboard rings that include a brooder positioned in the middle of the ring. Feed trays are positioned adjacent the brooder to provide feed for the growing poults.

Such a feed tray is typically about 24 inches long and 3½ inches wide and includes a spindle which prevents the poults from sitting thereon and discourages them from getting into the feed trays.

In the conventional practice, such feed trays are hand filled and under optimum conditions are kept full for the first five to ten days of the poults' life which requires that the tray be refilled with feed on a daily basis. This clearly is a labor intensive practice.

Further, it is common for the commercial grower to move such feed trays a short distance daily away from where it was originally placed to insure that wood shavings, rice hulls or other materials around the feed tray remain dry thereby preventing foot problems on the poults.

Thus, the present invention has been developed to eliminate the daily hand labor associated with filling the feed tray, to provide fresh feed to the poult while simultaneously reducing feed wastage, and to reduce the time and labor associated with having to periodically move the feeder.

SUMMARY OF INVENTION

After much research and study of the above mentioned problems, the present invention has been developed to provide an improved poultry feeder including a plurality of feed discharge openings for dispensing variable quantities of feed depending upon the dietary requirements of the particular fowl or animal.

The Improved Poultry Feeder of the present invention is a gravity fed device including a generally cylindrical feed hopper having an open bottom that is disposed in overlying relation to a circular feed tray having an upwardly extending conical surface which extends into the bottom opening of the hopper to define the discharge openings where feed is dispensed.

The feed hopper interlocks within a plurality of slots formed in the feeder tray to provide for incremental adjustment of the size of the discharge openings therebetween.

In this manner the Improved Poultry Feeder may be adapted to dispense feed in accordance the dietary requirements of a particular fowl at different stages of its life cycle and production.

In view of the above, it is an object of the present invention to provide an improved poultry feeder which will dispense variable quantities of feed depending upon the dietary requirements of the particular fowl or aninal.

Another object of the present invention is to provide an improved poultry feeder wherein a cylindrical feed hopper is disposed in functional relation to an underlying feed tray in an interlocking relationship such that a plurality of feed discharge openings are formed therein.

Another object of the present invention is to provide an improved poultry feeder which provides fresh feed continuously while simultaneously reducing feed wastage and reducing labor associated with filling and maintaining the same.

Another object of the present invention is to provide an improved poultry feeder having a reduced number of components and being fabricated from readily available plastic materials.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
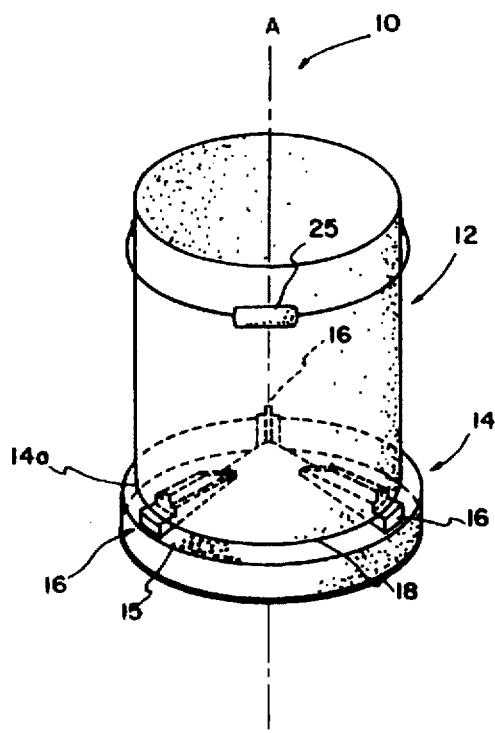
FIG. 1 is a perspective view of the improved poultry feeder of the present invention.

With reference to the drawings, an improved poultry feeder in accordance with the present invention is illustrated in FIG. 1 and indicated generally at 10.

Poultry feeder 10 includes a generally cylindrical feed storage hopper 12 having an open bottom and an open top wherein poultry feed 15 is contained.

Hopper 12 is mounted on a generally circular feed tray, indicated generally at 14, having an upwardly extending peripheral sidewall 14a and an upwardly projecting conical bottom surface 14b, whereon feed 15 is gravity fed from hopper 12 for consumption.

Feeder tray 14 also includes a plurality of hopper support pads, indicated generally at 16, which are adapted to provide vertical adjustment of the lower edge 12b of hopper 12 in relation to feeder tray 14 to control the discharge of feed 15 through discharge openings 18 as described hereinafter in further detail.

In the preferred embodiment, both hopper 12 and feeder tray 14 are fabricated by an injection molding process from any thermoplastic material suitable for this purpose such as polystyrene, polyamide, or acrylic resin.

Since such an injection molding process is well known to those skilled in the art, further detailed discussion of the same is not deemed necessary.

Figure 2:
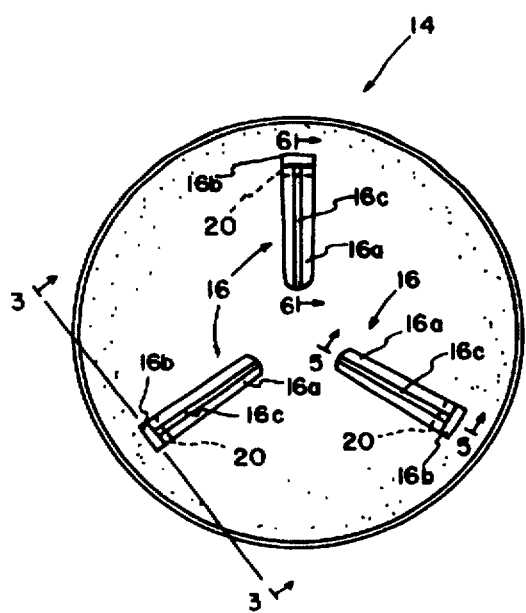
FIG. 2 is a top plane view of the feeder tray of the present invention showing the details of the construction thereof.

Referring now to FIG. 2, there is shown therein a top plan view of the feeder tray 14 showing a plurality of hopper support pads 16 integrally formed thereon. It can be seen that support pads 16 are positioned at regular angular intervals about a center axis A of the conical surface 14b of tray 14 so as to provide adequate support for hopper 12 when the same is disposed in functional relation to tray 14 and filled with feed 15.

Figure 3:
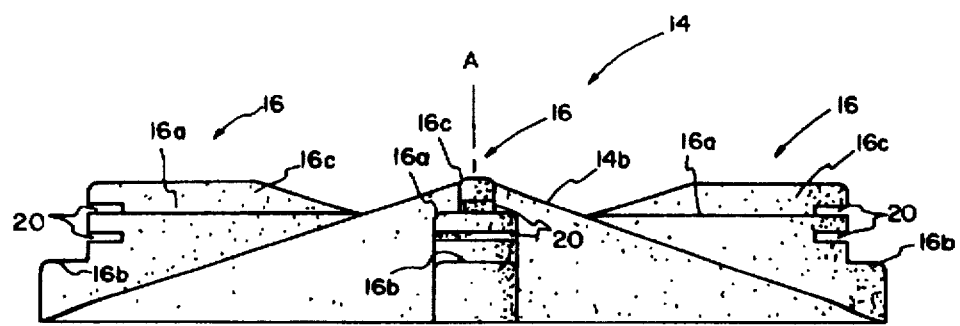
FIG. 3 is a front elevational view of the feeder tray of the present invention showing the stepped configuration of the hopper support pads integrally formed thereon.

As more clearly shown in FIG. 3, support pads 16 are formed in a stepped configuration including an upper step 16a and a lower step 16b. Pads 16 are also provided with at least one horizontally disposed slot 20 which is adapted to cooperate with hopper 12 to enable vertical adjustment of feed discharge openings 18 as described hereinafter in further detail.

Figure 4:
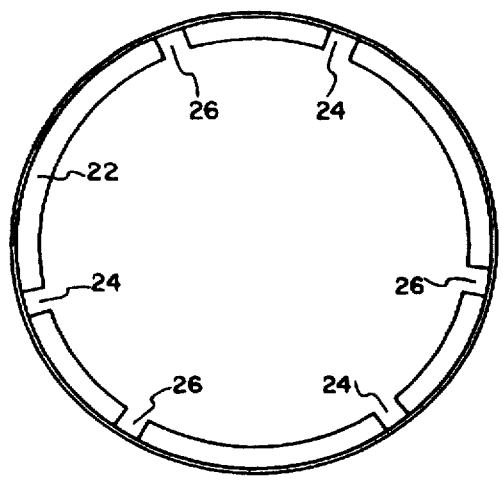
FIG. 4 is a top plane view of the feed hopper of the present invention showing the details of the construction thereof.

Referring now to FIG. 4, there is shown therein a plan view of hopper 12 including an internal ledge 22 integrally formed about the lower inner periphery of hopper 12 adjacent the bottom opening thereof and in generally perpendicular relation thereto. Internal ledge 22 is provided with a plurality of adjustment notches 24 and 26 of a predetermined width and depth at regular intervals about internal ledge 22.

It will be appreciated by those skilled in the art that adjustment notches 24 and 26 are positioned at the same angular intervals corresponding to support pads 16. Thus, hopper 12 may be positioned above feeder tray 14 with the pattern of notches 24 in alignment with pads 16 such that hopper 12 may be disposed in functional relation with feeder tray 14.

In this position, it will be appreciated that with slots 24 being sized to a sufficient width and radial dimension to provide clearance about upper step 16a, a lower edge 12b of hopper 12 will come into positive contact with lower step 16b defining the minimum vertical dimension of discharge opening 18.

Figure 5:
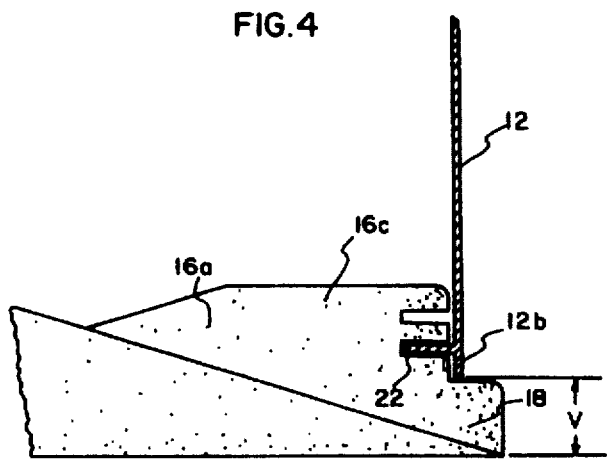
FIG. 5 is an enlarged cross sectional view of the feed hopper and the feeder tray of the present invention engaged at the minimum vertical dimension for the feed discharge openings.

In this position, hopper 12 may be partially rotated about center axis A thereof to engage internal ledge 22 into slots 20 thereby interlocking hopper 12 with feeder tray 14 at the minimum vertical height V for discharge opening 18 as more clearly shown in FIG. 5.

Similarly, a pattern of adjustment notches 26 maybe oriented in the same angular relationship corresponding to pads 16. Thus, in this alternative functional position, notches 26 may be aligned with pads 16 and disposed thereon.

Figure 6:
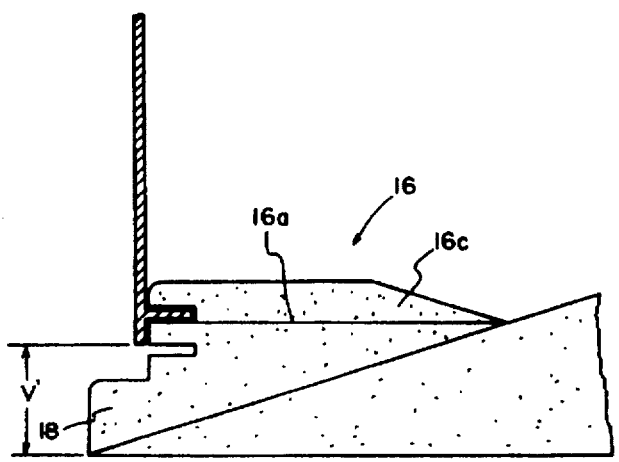
FIG. 6 is an enlarged cross sectional view showing the feed hopper and the feeder tray of the present invention engaged at the maximum vertical dimension of the discharge openings.

Notches 26 are sized to a sufficient width to provide clearance for the vertical riser 16c of pads 16 to pass therethrough such that internal ledge 22 comes into positive contact with the upper step 16a of pads 16 thereby defining the maximum vertical height V' of discharge opening 18 as shown in FIG. 6.

Similarly, in this position hopper 12 may be partially rotated about center axis A to engage internal ledge 22 with upper slot 20 to interlock hopper 12 with feeder tray 14 defining the maximum vertical height V' of discharge opening 18.

Although only two horizontal slots 20 have been illustrated herein for purposes of convenience, it will appreciated that any number of horizontally disposed slots 20 as desired may be configured vertically for incremental adjustment of feed discharge openings 18.

In the normal use of the present invention for feeding the turkey poult, hopper 12 is initially engaged in the uppermost slot 20 as shown in FIG. 6 to provide the maximum vertical height V' for discharge openings 18 and hopper 12 is filled with poultry feed 15. In this manner the feeder tray 14 remains filled to the brim with feed 15 during the first two or three days of the poult's production. Thereafter, the vertical height of discharge opening 18 may be adjusted to a lower position reducing the fill level of feeder tray 14 which will reduce feed wastage as the poults grow.

Feeder 10 is provided with a carrying handle 25 to permit the same to be conveniently moved to any desired location within the production facility.

Although the improved feeder of the present invention has been described primarily for use in the commercial poultry industry, it is understood that the feeder of the present invention may be adapted for use in feeding a number of species of livestock and other domestic animals.

From the above it can be seen that the present invention provides an adjustable poultry and livestock feeder that may be adapted to dispense feed in accordance with the dietary requirements of a particular species at various stages of life cycle and production.

In addition, the improved feeder consists of interlocking components which may be readily disassembled for cleaning and storage purposes.

Further, the improved feeder of the present invention may be fabricated from readily available materials by plastic injection molding and, thus, is relatively inexpensive to manufacture.

The terms "upper", "lower", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A gravity feeder especially for use in commercial poultry production capable of dispensing varying quantities of feed according to the dietary needs of a particular animal comprising:

a generally circular feed tray means including an upwardly projecting, conical surface having a center axis;

a generally cylindrical feed hopper means having a top opening and a bottom opening; said hopper means being positioned above and coaxial to said conical surface of said tray means, said bottom opening and said conical surface defining at least one feed means discharge opening therebetween; and adjustable means including at least one generally horizontally disposed slot formed therein, said at least one slot being adapted for engagement with at least one notch formed in an internal ledge adjacent the bottom opening of said hopper means whereby said feed tray means and said hopper means can be interlocked.

2. The feeder of claim 1 wherein said feed tray means includes a plurality of hopper support pad means being integrally formed therein and radially disposed about said axis of said conical surface at a radial dimension coincident with a diameter of said hopper means, said hopper support means being disposed at pre-determined angular intervals about said center axis, said hopper means being disposed in a balanced condition on said hopper support means and in coaxial relation to said conical surface in a position of disengagement.

3. The feeder of claim 1 wherein said tray means includes an upwardly extending peripheral side wall integrally formed therewith and being radially disposed about said hopper support means, said side wall extending to a vertical elevation above that of said of hopper support means whereby feed dispensed from said hopper means is contained within said tray means.

4. The feeder of claim 1 wherein said tray means and said hopper means are fabricated from a thermoplastic material utilizing an injection molding process.

5. The feeder of claim 4 wherein said plastic material is polystyrene.

6. The feeder of claim 1 wherein said hopper means is provided with a carrying handle attached to an external surface thereof.

7. The feeder of claim 1 wherein said adjustable means includes a plurality of generally horizontally disposed slots.

* * * * *